(12) United States Patent
Guichard et al.

(10) Patent No.: US 12,494,480 B2
(45) Date of Patent: Dec. 9, 2025

(54) CATHODE FOR ELECTROCHEMICAL ACCUMULATOR AND ASSOCIATED ACCUMULATOR, ENERGY STORAGE DEVICE AND MANUFACTURING METHOD

(71) Applicant: ARMOR, Nantes (FR)

(72) Inventors: Pierre Guichard, Reze (FR); Marie-Anne Blin, Orvault (FR)

(73) Assignee: ARMOR BATTERY FILMS, Nantes, PR (US)

( * ) Notice: Subject to any disclaimer, the term of this patent is extended or adjusted under 35 U.S.C. 154(b) by 0 days.

(21) Appl. No.: 16/698,219

(22) Filed: Nov. 27, 2019

(65) Prior Publication Data
US 2020/0176765 A1    Jun. 4, 2020

(30) Foreign Application Priority Data
Nov. 29, 2018 (FR) ...................... 18 72042

(51) Int. Cl.
| H01M 4/62 | (2006.01) |
| H01M 4/04 | (2006.01) |
| H01M 4/131 | (2010.01) |
| H01M 4/1391 | (2010.01) |
| H01M 4/36 | (2006.01) |
| H01M 4/505 | (2010.01) |
| H01M 4/525 | (2010.01) |
| H01M 10/0525 | (2010.01) |
| H01M 4/02 | (2006.01) |

(52) U.S. Cl.
CPC ......... *H01M 4/366* (2013.01); *H01M 4/0404* (2013.01); *H01M 4/131* (2013.01); *H01M 4/1391* (2013.01); *H01M 4/505* (2013.01); *H01M 4/525* (2013.01); *H01M 4/622* (2013.01); *H01M 4/625* (2013.01); *H01M 10/0525* (2013.01); *H01M 2004/028* (2013.01)

(58) Field of Classification Search
CPC .................................................. H01M 4/366
See application file for complete search history.

(56) References Cited

U.S. PATENT DOCUMENTS

| 2010/0291442 A1* | 11/2010 | Wang ................. H01M 10/052 |
| | | 429/231.95 |
| 2011/0068001 A1* | 3/2011 | Affinito ................ H01M 4/134 |
| | | 156/247 |
| 2013/0209889 A1 | 8/2013 | Takahata |
| 2013/0316232 A1 | 11/2013 | Iijima et al. |
| 2014/0072873 A1 | 3/2014 | Wang et al. |
| 2014/0162138 A1* | 6/2014 | Fujiki ............... H01M 10/0562 |
| | | 429/304 |
| 2014/0162140 A1* | 6/2014 | Hoshiba ............ H01M 10/0562 |
| | | 429/304 |
| 2015/0214552 A1 | 7/2015 | Cho et al. |
| 2018/0183047 A1 | 6/2018 | Sakamoto et al. |
| 2021/0280862 A1* | 9/2021 | Han ...................... H01M 4/382 |

FOREIGN PATENT DOCUMENTS

| JP | 2003-157852 A | 5/2003 |
| JP | 2014-154360 A | 8/2014 |
| JP | 2019-215309 A | 12/2019 |
| WO | 2018/180742 A1 | 10/2018 |

OTHER PUBLICATIONS

Rapport De Recherche Préliminaire issued in corresponding French Patent Application No. FR 1872042 dated Jul. 26, 2019 (in French).
Search report issued in European Patent Application No. 19212644.9 dated May 4, 2020.

\* cited by examiner

*Primary Examiner* — Austin Murata
(74) *Attorney, Agent, or Firm* — Troutman Pepper Locke LLP

(57) ABSTRACT

The invention relates to a cathode for an electrochemical accumulator including a current collector, an interfacing layer, the interfacing layer being coated on the current collector, and an electrode, the electrode being formed by deposition, in particular by coating, of a first composition on the interfacing layer, the first composition having a hydrogen potential greater than or equal to 10, preferably greater than or equal to 12, the hydrogen potential being measured at a temperature of 25° C.

16 Claims, 2 Drawing Sheets

CATHODE FOR ELECTROCHEMICAL ACCUMULATOR AND ASSOCIATED ACCUMULATOR, ENERGY STORAGE DEVICE AND MANUFACTURING METHOD

CROSS REFERENCE TO RELATED APPLICATION

This patent application claims the benefit of French Patent Application No. FR 18 72042 filed on Nov. 29, 2018, the entire contents of which are hereby incorporated by reference.

TECHNICAL FIELD

The present invention relates to a cathode made by depositing an alkaline cathode composition. The present invention also relates to an electrochemical accumulator and an energy storage device including the preceding cathode. The present invention also relates to a method for manufacturing the preceding cathode.

BACKGROUND

An electrochemical accumulator conventionally comprises a positive electrode, a negative electrode, an electrolyte and current collectors for each electrode. The assembly of a negative electrode and a current collector forms an anode, while the assembly of a positive electrode and a current collector forms a cathode.

The operating principle of such accumulators is based on the reversible storage of electrical energy into chemical energy by using two separate and coupled electrochemical reactions. The positive and negative electrodes bathe in the electrolyte and are the seat of electrochemical reactions, called faradic reactions. The electrodes are in particular made from active materials making it possible to store and release the ions through oxidation and reduction reactions.

The electrodes are made by depositing a composition, the composition primarily including one or several active material(s), conductive particles ensuring a good transport of the electrons to the set of active materials and a binder that makes it possible to ensure the cohesion of the particles and the adhesion of the substrate.

Next, the two positive and negative electrodes are ionically linked by an electrolyte that can be liquid, in gel form or solid. During the discharge, the active material at the negative electrode oxidizes and releases part of the electrons that are conveyed by means of the current collector toward the outer circuit and on the other hand cations that migrate through the electrolyte toward the positive electrode. Next, the electrons and the cations are captured by the active material at the positive electrode, which is reduced.

Traditionally, the composition is a dispersion with a base of an organic solvent, also called organic base, such as N-methylpyrrolidone, also referred to using the acronym NMP. The binder, typically polyvinylidene fluoride (or PVDF), is dissolved in the solvent. The conductive particles and the active materials are suspended in the solution.

Compositions with a base of a mixture of NMP and PVDF have good visco-mechanical properties that allow coating on an industrial scale at a high coating speed.

However, the industrial manufacturing methods of electrodes with an organic base also have many drawbacks, including their high cost. Furthermore, organic solvents have a high vaporization temperature, and the elimination of the solvent during drying of the electorate is therefore done at a high temperature, typically at 120° C. in the case of NMP. Furthermore, the use of organic solvents requires the establishment of complex and costly recycling methods, in addition to the need for the establishment of specific protection measures due to the risks of flammability and explosion of such solvents.

SUMMARY

There is therefore a need for a cathode that is easier to manufacture, and in particular a cathode that allows quicker and easier manufacturing.

To that end, proposed is a cathode for an electrochemical accumulator including a current collector, an interfacing layer, the interfacing layer being coated on the current collector, and an electrode, the electrode being formed by deposition, in particular by coating, of a first composition on the interfacing layer, the first composition having a potential of hydrogen greater than or equal to 10, preferably greater than or equal to 12, the potential of hydrogen being measured at a temperature of 25° C.

According to specific embodiments, the cathode comprises one or more of the following features, considered alone or according to any technically possible combinations:

- the first composition is a water-based cathode composition comprising a first insertion material, a first binder material and first conductive additive.
- the first insertion material is chosen from among lithium-nickel-cobalt-manganese oxides, lithium-nickel-cobalt-aluminum oxides and a mixture thereof, the first insertion material being present in the composition in a dissolved form.
- the first binder material is chosen from among polyacrylic acids, polyvinyl alcohol, polyvinylpyrrolidone, hydroxypropyl cellulose, polyurethane, sodium alginate, styrene-butadiene and a mixture thereof.
- the interfacing layer is formed by deposition, in particular by coating, on the current collector of a second composition, the second composition comprising a second binder material and a second conductive additive, the second binder material comprising at least one polymer chosen from among carboxymethylcellulose, polyvinylpyrrolidone, polyvinyl alcohols, ethylene-vinyl alcohol copolymers, polyacrylic acid, polyvinyl butyral, polyethylene glycol, polyimides, in particular polyamide-imides and polyether-imides, polyurethanes, acrylic styrenes, polyvinyl chloride, acrylic copolymers, methacrylic ester acids, fluorinated copolymers and a mixture thereof.
- the interfacing layer is formed by deposition, in particular by coating, on the current collector of a second composition, the second composition comprising a second binder material and a second conductive additive, the second binder material comprising at least one compound chosen from among an ethylene-vinyl alcohol copolymer, a polyvinyl alcohol, a mixture of a polymer from the family of polyimides with an ethylene-vinyl alcohol copolymer, a mixture of a polymer from the family of polyimides with a polyvinyl alcohol and a mixture of a polymer from the family of polyimides with an ethylene-vinyl alcohol copolymer and with a polyvinyl alcohol.
- the second binder material is devoid of polyamide.
- the interfacing layer has a thickness greater than or equal to 1 micrometer.
- the interfacing layer has a thickness less than or equal to 4 micrometers.

the interfacing layer has a thickness less than or equal to 2 micrometers.

the current collector is a metallic strip.

the current collector is an aluminum strip.

The present description also relates to an electrochemical accumulator including a cathode as previously described.

The present description also describes an energy storage device including a set of accumulators, at least one accumulator being an accumulator as previously described.

According to one specific embodiment, the energy storage device is a battery.

According to one specific embodiment, the energy storage device is a lithium-ion battery.

The present description also relates to a method for manufacturing a cathode for an electrochemical accumulator comprising a step for preparing a first composition, the first composition having a potential of hydrogen greater than or equal to 10, the potential of hydrogen being measured at a temperature of 25° C., and a deposition step, in particular by coating, of the first composition on a substrate formed by a current collector and an interfacing layer, the first composition being deposited, in particular coated, on the interfacing layer.

According to one specific embodiment, the manufacturing method comprises a step for preparing a second composition comprising suspending a second binder material and a second conductive additive in water, and a step for depositing, in particular by coating, the second composition on the current collector to form the interfacing layer.

BRIEF DESCRIPTION OF THE DRAWINGS

Other features and advantages of the invention will appear upon reading the following description of embodiments of the invention, provided as an example only and in reference to the drawings, which are.

DETAILED DESCRIPTION

Figure 1:
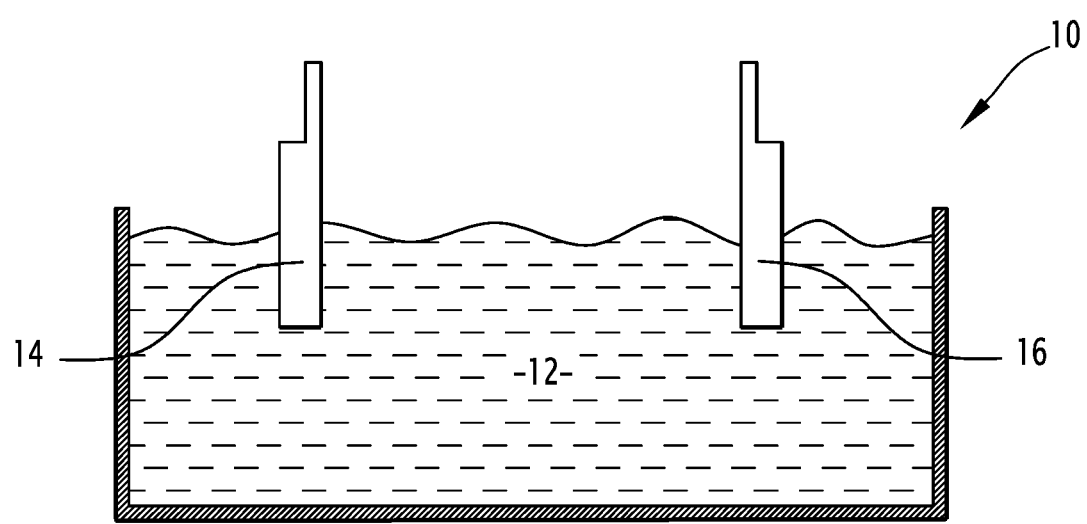
FIG. 1 is a schematic illustration of a battery accumulator including a cathode.

An electrochemical accumulator 10 is shown in FIG. 1.

The accumulator 10 is intended to be linked to other electrical accumulators in order to form an energy storage device, in particular an electrical generator of desired voltage and capacity.

Such a generator is called accumulator battery, or more simply a battery.

According to the described example, the accumulator 10 is a lithium-ion accumulator intended for a lithium-ion battery.

The accumulator 10 uses a reversible energy conversion technique to store the energy and retrieve it later.

The described accumulator 10 using an electrochemical reaction, the accumulator 10 is an electrochemical accumulator.

The accumulator 10 includes an electrolyte 12, an anode 14 and a cathode 16.

The accumulator 10 works like an electrochemical accumulator owing to the interaction between the electrolyte 12, the anode 14 and the cathode 16.

The electrolyte 12 is made up of different ionic salts contributing ions used for the charge storage or faradic reactions, of carbonates and a solvent or mixture of solvents to allow the solubilization of the ions.

The ionic salts are chosen from among lithium hexafluorophosphate (LiPF6), lithium bis(trifluoromethanesulfonyl)imide (LiTFSI), lithium tetrafluoroborate (LiBF4), lithium bis(oxalato)borate (LiBOB), lithium difluoro(oxalato)borate (LiDFOB) and a mixture thereof.

The carbonates are for example propylene carbonate (PC), ethylene carbonate (EC), dimethyl carbonate (DMC), ethyl methyl carbonate (EMC) or diethyl carbonate (DEC).

It is also possible to find, in smaller proportion, methyl acetate or methyl formate, acetonitrile, tetrahydrofuran or gamma-butyroactone, and binary or ternary mixtures, or even quaternary mixtures thereof, as well as ionic liquids.

The anode 14 is made up of an insertion material of the ions, such as carbon. The carbon is used very primarily in the form of mesophase microbeads, commonly referred to as "MesaCarbon MicroBeads (MCMB), in the form of artificial or natural graphites or graphitic materials such as soft carbon or hard carbon. In a variant, the insertion material is chosen from among other types of negative electrode materials with a base of lithium titanate, such as $Li_4Ti_5O_{12}$ (also referred to using the acronym LTO), or with a base of silicon, tin or alloys.

The expression "the compound chosen from among a compound A, a compound B and a compound C" means that said compound is chosen from the group made up of the compound A, the compound B and the compound C.

Figure 2:
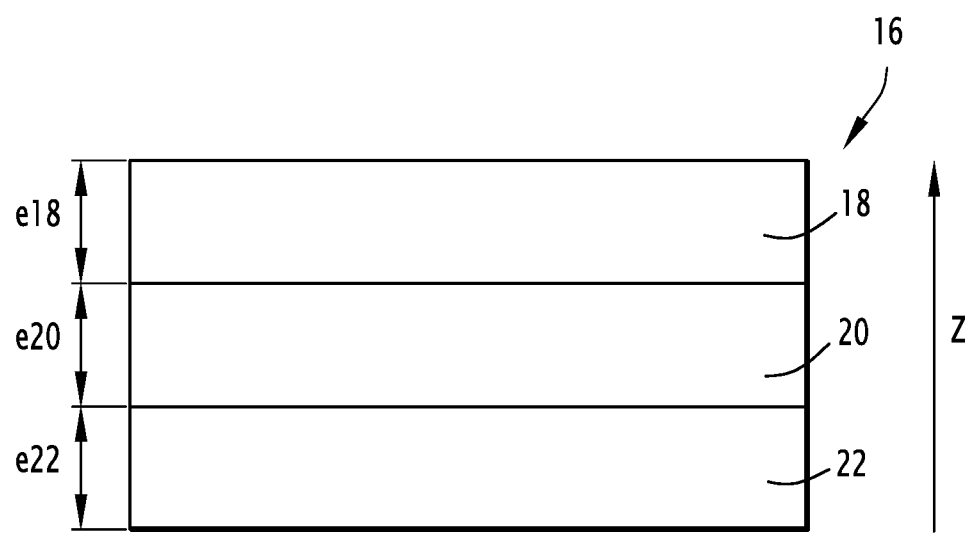
FIG. 2 is a schematic sectional side illustration of the cathode of the accumulator.

The cathode 16 is shown in more detail in FIG. 2.

The cathode 16 includes an electrode 18, an interfacing layer 20 and a current collector 22.

The electrode 18, the interfacing layer 20 and the current collector 22 form a stack of layers in a stacking direction denoted Z, the interfacing layer 20 being positioned between the electrode 18 and the current collector 22.

The electrode 18 is in contact with the electrolyte 12.

The electrode 18 for example has a thickness e18 of between 10 micrometers and 100 micrometers, the thickness e18 being measured in the stacking direction Z.

The electrode 18 is formed by depositing a first composition C1 on the interfacing layer 20.

The first composition C1 includes a first insertion material MI1, a first binder material ML1, a first conductive additive AC1 and a first solvent S1.

Preferably, the first composition C1 is made up of a first insertion material MI1, a first binder material ML1, a first conductive additive AC1 and a first solvent S1.

The insertion material is also referred to as "active material".

The first insertion material MI1 is chosen from among lithium metal oxides. Preferably, the first insertion material MI1 is chosen from among lithium-nickel-cobalt-manganese oxides $LiNiMnCoO_2$ (referred to using the acronym NMC), lithium-nickel-cobalt-aluminum oxides, or a mixture thereof.

The first composition C1 comprises a mass content of between 80% and 98% of first insertion material MI1. Preferably, the first composition C1 comprises a mass content of between 91% and 95% of first insertion material MI1.

In the remainder of the document and unless otherwise indicated, the mass content of a compound in a composition is defined as the ratio of the mass of said compound to the total mass of the compounds in said composition, the mass of the solvent being excluded. Said content is also referred to by the expression "dry mass content".

In the remainder of the document, "a value is comprised between A and B" means that the value is greater than or equal to A and less than or equal to B.

Advantageously, the first insertion material MI1 is present in the first composition C1 in a dissolved form.

This means that at least 95% by mass of the first insertion material MI1 in the first composition C1 is found in dissolved form.

The choice of the first binder material ML1 varies considerably as long as the first binder material ML1 is inert relative to the other materials of the electrode 18. The first binder material ML1 is a typically polymeric material, making it possible to facilitate the use of the electrodes during their manufacture.

The first binder material ML1 is soluble in water at ambient temperature. "Soluble in water at ambient temperature" means that the solubility of the first binder material ML1 in water at 20° C. and at a pressure of 0.1 MPa is greater than or equal to 95% by mass.

The first binder material ML1 comprises one or several polymers chosen from among thermoplastic polymers, thermosetting polymers, elastomers and a mixture thereof.

Examples of thermoplastic polymers comprise but are not limited to polymers derived from the polymerization of aliphatic or cycloaliphatic vinyl monomers, such as polyolefins (including polyethylenes or polypropylenes), polymers derived from the polymerization of aromatic vinyl monomers, such as polystyrenes, polymers derived from the polymerization of acrylic monomers and/or methacrylates, polyamides, polyether ketones, polyimides.

Examples of thermosetting polymers comprise, but are not limited to, thermosetting resins (such as epoxide resins or polyester resins), optionally mixed with polyurethanes or with polyol polyethers.

Examples of elastomeric polymers comprise, but are not limited to, natural rubbers, synthetic rubbers, styrene-butadiene copolymers (also referred to using the abbreviation "SBR"), ethylene-propylene copolymers (also referred to using the abbreviation "EPM") and silicones.

According to one specific embodiment, the first binder material ML1 is a mixture of thermoplastic polymer(s), thermosetting polymer(s) and/or elastomeric polymer(s).

Other appropriate first binder material(s) ML1 comprise cross-linked polymers, such as those manufactured from polymers having carboxyl groups and cross-linking agents.

Preferably, the first binder material ML1 is chosen from among polyacrylic acids, polyvinyl alcohol, polyvinylpyrrolidone, carboxymethylcellulose, hydroxypropyl cellulose, fluorinated latex, polyurethane, sodium alginate, styrene-butadiene and a mixture thereof.

The first composition C1 comprises a mass content in first binder material ML1 comprised between 1% and 10%. The mass content in first binder material ML1 in the first composition C1 is preferably less than or equal to 5%. Typically, the first composition C1 comprises a mass content in first binder material ML1 comprised between 2.5% and 5%.

The first conductive additive AC1 includes one or several types of conductive elements for improving the electronic conductivity.

Examples of conductive elements comprise, but are not limited to, conductive carbons, graphites, graphenes, carbon nanotubes, activated carbon fibers, non-activated carbon nanofibers, metallic flakes, metallic powders, metallic fibers and electrically conductive polymers.

A nanofiber is defined as a fiber having a diameter of maximum size comprised between 1 nanometer and 100 nanometers and extending along a direction normal to said diameter.

A nanotube is defined as a tube having an outer diameter of maximum size comprised between 1 nanometer and 100 nanometers and extending along a direction normal to said diameter.

The first composition C1 comprises a mass content in first conductive additive AC1 comprised between 1% and 10%.

The mass content in first conductive additive AC1 is preferably less than or equal to 4%. For example, the first composition C1 comprises a mass content in first conductive additive AC1 greater than or equal to 2.5%.

The first solvent S1 is water, in liquid state.

Due to the presence of the first solvent S1, the cathode 16 is referred to as water-based cathode, or aqueous-based cathode.

The first composition C1 has a potential of hydrogen, or pH, greater than or equal to 10. The pH is measured at a temperature of 25° C., at a pressure of 0.1 MegaPascal (MPa).

The potential of hydrogen is a measure of the chemical activity of the hydrogen ions in solution, in particular in aqueous solution where these ions form oxonium ions with the water (also called hydronium) $H_3O^+$. The potential of hydrogen, commonly abbreviated to pH, reflects the acidity of the solution. For a diluted aqueous solution, the pH is comprised between 0 and 14, the values 0 and 14 being included. For example, in an aqueous medium diluted to 25° C., a pH of 7 is said to be neutral, a pH strictly greater than 7 is said to be basic (or alkaline), and a pH strictly less than 7 is said to be acid.

The pH of the composition C1 is defined as the pH of the composition C1 at the moment of the deposit of the first composition C1 on the interfacing layer 20, as will be described in more detail later. "At the moment of the deposit" refers to a length of time of less than or equal to one minute before the beginning of the deposit. No compound is added to the first composition C1 during this length of time.

Preferably, the first composition C1 has a pH greater than or equal to 12.

The electrode 18 is deposited on the interfacing layer 20.

The interfacing layer 20 has a thickness e20 of less than or equal to 5 micrometers, the thickness e20 being measured in the stacking direction Z.

Preferably, the interfacing layer 20 has a thickness e20 of greater than or equal to 10 nanometers. Advantageously, the interfacing layer 20 has a thickness e20 of between 500 nanometers and 2 micrometers.

The interfacing layer 20 is made by depositing a second composition C2 on the current collector 22.

The second composition C2 includes a second binder material ML2 and a second conductive additive AC2. Advantageously, the second composition C2 consists of a second binder material ML2, a second conductive additive AC2 and a second solvent S2.

The second binder material ML2 comprises one or several polymers chosen from among thermoplastic polymers, thermosetting polymers and a mixture thereof.

Examples of thermoplastic polymers comprise but are not limited to polymers derived from the polymerization of aliphatic or cycloaliphatic vinyl monomers, such as polyolefins, preferably polyethylenes and polypropylenes, polymers derived from the polymerization of aromatic vinyl monomers, such as polystyrenes, polymers derived from the polymerization of acrylic monomers and/or methacrylates, polyether ketones, polyimides, polyvinyl alcohols, fluorinated polymers, polyacrylonitrile.

Examples of thermosetting polymers comprise, but are not limited to, thermosetting resins (such as epoxide resins, polyester resins), optionally mixed with polyurethanes or with polyol polyethers, cross-linked polymers, in particular manufactured from polymers having carboxyl groups and cross-linking agents.

According to one specific embodiment, the second binder material ML2 comprises a polymer chosen from among carboxymethylcellulose, polyvinylpyrrolidone, polyvinyl alcohols, ethylene-vinyl alcohol copolymers, polyacrylic acid, polyvinyl butyral, polyethylene glycol, polyimides, in particular polyamide-imides and polyether-imides, polyurethanes, acrylic styrenes, polyvinyl chloride, acrylic copolymers, methacrylic ester acids, fluorinated copolymers polysaccharides, ethylene, acrylic acid copolymers and a mixture thereof.

It should be noted that the second binder material ML2 is devoid of polyamide.

Preferably, the second binder material ML2 comprises a mixture of a first polymer and a second polymer.

The first polymer is chosen from among polyimides, polyimide precursors, polyamide-imides, polyamide-imide precursors, polyether-imides, polyurethanes, acrylic styrenes, polyvinyl chlorides, polyvinyl butyrals, acrylic copolymers, methacrylic ester acids, fluorinated copolymers and a mixture thereof.

The second polymer is chosen from among carboxymethylcellulose, polyvinylpyrrolidone, polyvinyl alcohols (also referred to using the acronym PVA), ethylene-vinyl alcohol copolymers (also referred to using the acronym EVOH), polyacrylic acid, polyethylene glycol, and a mixture thereof.

Advantageously, the second binder material ML2 comprises a mixture of a polymer from the family of polyimides with an ethylene-vinyl alcohol copolymer or a mixture of a polymer from the family of polyimides with a polyvinyl alcohol.

"A polymer from the family of polyimides" refers to a polymer chosen from among polyimides, polyamide-imides and polyether-imides.

Preferably, the second binder material ML2 comprises a mixture of the first polymer and the second polymer as previously defined, the mass content of the first polymer in the second binder material ML2 being greater than or equal to 20%, preferably greater than or equal to 40% and less than or equal to 80%.

The second binder material ML2 is amorphous, semi-crystalline or crystalline.

The second composition C2 comprises a mass content in second binder material ML2 greater than or equal to 20%.

The mass content in second binder material ML2 in the second composition C2 is preferably less than or equal to 80%. For example, the second composition C2 comprises a mass content in second binder material ML2 comprised between 40% and 70%.

The second conductive additive AC2 includes one or several conductive elements for improving the electronic conductivity.

For example, the second conductive additive AC2 is chosen from among conductive carbon blacks, acetylene blacks, graphites, graphenes, carbon nanotubes, nonactivated carbon nanofibers and a mixture thereof.

Preferably, the second conductive additive AC2 comprises a mixture of carbon blacks and graphite.

The second composition C2 comprises a mass content in second conductive additive AC2 less than or equal to 70%.

The mass content in second conductive additive AC2 in the second composition C2 is preferably greater than or equal to 20%. For example, the second composition C2 comprises a mass content in second conductive additive AC2 comprised between 30% and 60%.

The second solvent S2 is chosen from among water, ethanol, butanol, isopropyl alcohol (also called isopropanol), glycol ether and a mixture thereof.

The interfacing layer 20 forms an interface between the current collector 22 and the electrode 18.

This in particular means that the interfacing layer 20 is a layer in contact on the one hand with the current collector 22 and on the other hand with the electrode 18.

The current collector 22 has a thickness e22 comprised between 8 micrometers and 30 micrometers, preferably comprised between 12 µm and 20 µm.

The current collector 22 is made from a material that is conductive enough to ensure electronic transport, light, fine and mechanically strong to serve as a substrate for the electrode 18.

For example, the current collector 22 is a metallic strip, preferably an aluminum strip. In a variant, the current collector 22 is made from an aluminum alloy.

The operation of the accumulator 10 is according to the operation of an electrochemical accumulator of the state of the art.

The operation of the accumulator 10 according the invention is based on the reversible exchange of lithium ions $Li^+$ between the cathode 16 and the anode 14.

It should be noted that the interfacing layer 20 improves the interface between the current collector 22 and the electrode 18, by optimizing the adhesion and the contact resistance. The contact resistance has a major effect on the electronic conductivity of the assembly, a strong resistance acting as a barrier to the transfer of electrons during the charge/discharge cycle. The interfacing layer 20 helps reduce this phenomenon, by improving the conduction path.

The interfacing layer 20 protects the current collector 22 by cutting off the access of the electrolyte to the current collector 22.

The interfacing layer 20 acts on the stabilization of the potential of the interface between the current collector 22 and the electrode 18, as illustrated by the results of the experiment 1 outlined hereinafter.

The interfacing layer 20 also acts as a physical barrier to the access of the ions responsible for the corrosion.

When the current collector 22 is made from aluminum, the interfacing layer 20 protects the current collector 22 from corrosion by preventing the formation of $Al(OH)_4^-$ or $AlO_2^-$ ions on the surface of the current collector 22. The formation of such ions deteriorates the performance of an accumulator of the state of the art by increasing the electrical interface resistance and reacting with the insertion material MI1 of the electrode. In the absence of protection, the metallic strip is damaged in several seconds by alkaline solutions with a pH exceeding 8.5 at 25° C. at 0.1 Megapascal (MPa).

Relative to an accumulator of the state of the art, the performance levels are improved.

Furthermore, the cathode 16 is quick and easy to manufacture, which makes it particularly suitable for large-scale production. In particular, the first composition C1 is stable, quick and easy to deposit on the interfacing layer 20.

The use of a water-based cathode 16 reduces costs relative to an organic-based cathode, in particular by simplifying the recycling and waste management methods, and limiting the risks of flammability and explosion.

The manufacture of the cathode 16 is simpler to implement relative to a cathode of the state of the art.

The method for manufacturing the cathode 16, which will now be described, is easy to implement on a large scale.

The method for manufacturing the cathode 16 comprises a phase for preparing the first composition C1, a phase for preparing the second composition C2, a phase for preparing the interfacing layer 20 and a phase for manufacturing the electrode 18.

The phase for manufacturing the interfacing layer 20 includes a step for depositing the prepared second composition C2 on a current collector 22. The current collector 22 is preferably a metal strip, in particular a strip made from aluminum or aluminum alloy.

The deposition of the second composition C2 is implemented according to a technique chosen from coating or printing techniques.

For example, the second composition C2 is deposited on the current collector 22 using a technique chosen from coating or wet scrolling printing, in particular the bare coater technique, the slot-die technique, gravure printing methods, screen printing methods and flexography.

The phase for manufacturing the electrode 18 comprises a step for depositing the first composition C1 on the interfacing layer 20.

The deposition of the first composition C1 is implemented according to a technique chosen from coating or printing techniques previously described.

The electrode 18 and the cathode 16 are thus obtained.

The cathode 18 thus has a good resistance to corrosion, while having satisfactory electrochemical performance, as will now be described in detail in the experimental section.

EXPERIMENTAL SECTION

The experiment below was conducted on samples devoid of cathode composition in order to study the impact of different interfacing layers on the properties of the samples, in particular their chemical resistance to a composition having an alkaline pH.

Experiment 1

Materials

In this study, a strip of aluminum (series 1000, thickness of 20 micrometers) was used as a current collector.

Six carbon-based formulations suitable for constituting the interfacing layer were prepared.

The compositions (abbreviated Comp.) of the different tested formulations are grouped together in table 1 below.

TABLE 1

Compositions of the different tested formulations, the percentages being expressed relative to the total weight of the formulation

|  | Comp. A | Comp. B | Comp. C | Comp. D | Comp. E | Comp. F |
|---|---|---|---|---|---|---|
| Conductive carbon | 46% | 46% | 46% | 46% | 46% | 46% |
| Polyimide | 54% | 0% | 34% | 48% | 43% | 0% |
| EVOH | 0% | 54% | 20% | 6% | 11% | 0% |
| Polyamide | 0% | 0% | 0% | 0% | 0% | 54% |

The six formulations were coated with an automatic film applicator on the bare aluminum strip in order to form seven samples. The thermal conditions applied to the different collectors are in the order of 1 to 5 min at temperatures from 180° C. to 220° C. The thickness of the interfacing layers after drying is between 1 µm and 4 µm as reported in table 2.

Characterization

The adherence of the interfacing layer on the aluminum strip is evaluated by performing a peeling test with a Scotch™ 2525 adhesive by the brand 3M™ having a width of 25 millimeters and an adherence of 7.5 N/cm (Newton per centimeter). A strip of adhesive is applied on the current collectors coated with interfacing layers, at a controlled pressure. The strip is peeled manually at an angle of 180°. A similar method is described in standard AFERA 5001. The rupture profile is observed with the naked eye. The rupture profile is evaluated on a scale from 1 to 4 based on the coating quality remaining on the substrate. A score of 4 means that there is no stripping of the coating, reflecting maximum adherence of the interfacing layer with the current collector. A score of 1 means that there is complete stripping of the coating, reflecting minimum adherence of the interfacing layer with the current collector.

The transverse electrical resistance of a collector is evaluated by pressing the current collectors, which may or may not be coated by interfacing layers, between two conductive chips, linked to an ohmmeter, which allow the passage of the current in the transverse direction of the current collector. The pressure applied between the conductive chips is 0.27 MPa. The lower the transverse electrical resistance is, the better the passage of the current is.

The resistance of the coating with the electrolyte is evaluated on samples of collectors coated with interfacing layers measuring 3 centimeters by 2 centimeters, dried under vacuum then immersed in a vial filled with electrolyte formed by a mixture of ethylene carbonate, dimethyl carbonate and lithium hexafluorophosphate at 1 mole/liter for 72 hours at 60° C. After immersion, the samples undergo a manual friction test to evaluate the chemical resistance of the coating. When the coating stays present on the current collector, the rating is 4, and when the coating is completely eliminated, the score is 1.

The alkaline chemical resistance is evaluated by depositing five drops of sodium hydroxide with a volume of 500 microliters each on the current collector, which may or may not be coated with an interfacing layer and corresponds to the time after which the first bubbles appear. The appearance of bubbles indicates the oxidation-reduction reaction between the sodium hydroxide and the aluminum, characterized by a release of dihydrogen ($H_2$) bubbles.

The sodium hydroxide solution used simulates the contact of the alkaline electrodes 18 with the coated current collectors 22 and makes it possible to evaluate the property of the interfacing layer 20 to protect the current collectors from the alkalinity of the electrodes. By correlation with the maximum pHs of the alkaline aqueous electrodes, the tests are done with sodium hydroxide having a pH equal to 12 and pH equal to 13.

The seven samples E1 to E7 were tested and the results are shown in table 2 below. A sample E0 is devoid of interfacing layer and serves as reference to evaluate the impact of the interfacing layer on the different tested properties.

TABLE 2

Study of the influence of the interfacing layer on the properties of the cathode

|  | E0 | E1 | E2 | E3 | E4 | E5 | E6 | E7 |
|---|---|---|---|---|---|---|---|---|
| Composition of the interfacing layer | / | Comp. A | Comp. B | Comp. B | Comp. C | Comp. D | Comp. E | Comp. F |
| Thickness of the interfacing layer (in micrometers) | Not relevant | 1 to 2 µm | 1 to 2 µm | 4 µm | 1 to 2 µm | 1 to 2 µm | 1 to 2 µm | 1 to 2 µm |
| Adherence of the interfacing layer (score from 1 to 4) | Not relevant | 2 | 4 | 4 | 4 | 4 | 4 | 4 |
| Transverse electrical resistance (in milli Ohm) | Not relevant | 10 | 5 | 8 to 10 | 5 to 10 | 5 to 10 | 5 to 10 | >300 |
| Resistance of the coating to the electrolyte (score from 1 to 4) | Not relevant | 2 | 4 | 4 | 4 | 3 | 3 | 2 |
| Alkaline chemical resistance at pH 12 | 2 seconds | >1 hour | From 2 to 7 minutes | From 3 to 10 minutes | From 45 minutes to 1 hour | >1 hour | >1 hour | >1 hour |
| Alkaline chemical resistance at pH 13 | 2 seconds | >1 hour | 1 minute | 1 minute | 15 to 30 minutes | 50 minutes | 40 minutes | >1 hour |

Results and Discussion

These results clearly show that in the absence of interfacing layer (sample E0), the current collector is immediately damaged by the sodium hydroxide.

The interfacing layer (sample E1 to E7) delays the damage of the current collector by the sodium hydroxide for at least one minute at a pH of 13, and for several minutes at a pH of 12.

The use of a polyimide in the interfacing composition (sample E1) makes it possible to delay the damage of the current collector by the sodium hydroxide considerably.

An interfacing layer containing an ethylene-vinyl alcohol copolymer alone (samples E2 and E3) protects the current collector from alkaline damage for at least one minute. Such a coated current collector withstands the corrosion caused by the electrolyte well, and the electrical resistance is cut in half relative to the current collector of the sample E1. The alkaline protection level imparted to the current collector (in the order of a minute) is interesting for preparation methods allowing a fast coating speed and a short drying time.

A current collector coated with an interfacing layer containing a polyimide and an ethylene-vinyl alcohol copolymer (samples E4 to E6) has a resistance time to the sodium hydroxide of several tens of minutes, which is compatible with many coating methods. Furthermore, the properties of adherence to metal, chemical resistance to the electrolyte and electrical resistance are similar to those observed for the current collectors coated with an interfacing layer containing an ethylene-vinyl alcohol copolymer alone.

These results show that the use of a current collector coated with an interfacing layer comprising at least one of a first polymer and a second polymer as previously defined protects the current collector from the corrosion generated during the deposition of the aqueous electrode on its support.

The comparison of the samples E2 and E3 shows that a collector made with an ethylene-vinyl alcohol copolymer makes it possible to obtain a low transverse electrical resistance and a good chemical resistance to the electrolyte (at least 4). Alkaline chemical resistances greater than several minutes are also observed.

Thus, the use of an ethylene-vinyl alcohol copolymer to produce a coated current collector makes it possible to obtain such a collector whose properties have a low transverse electrical resistance, a high level of adherence to aluminum and a good chemical resistance to the electrolyte while significantly improving the alkaline chemical resistance with respect to the aqueous electrode.

The use of a polyimide mixed with an ethylene-vinyl alcohol copolymer (sample E4 to E6) makes it possible to obtain a coated current collector whose properties have a low transverse electrical resistance, a high level of adherence to aluminum and a good chemical resistance to the electrolyte while greatly improving the alkaline chemical resistance with respect to the aqueous electrode, which makes it possible to consider depositing alkaline electrodes beyond one minute. This therefore imparts greater flexibility to electrode manufacturers in developing coating methods for corrosive components.

A current collector coated with an interfacing layer containing a polyamide (sample E7) has a resistance time to sodium hydroxide, adherence properties to metal and chemical resistance properties to the electrolyte comparable to those of a current collector coated with an interfacing layer containing a polyimide and an ethylene-vinyl alcohol copolymer (samples E4 to E6).

Conversely, such a collector (sample E7) has a very high transverse electrical resistance that does not make it possible to achieve appropriate electrical performance levels. Unlike samples E1 to E6, sample E7 does not combine both high alkaline resistance and low electrical resistance properties.

The invention claimed is:

1. A cathode for an electrochemical accumulator comprising:
    a current collector;
    an interfacing layer, the interfacing layer being coated on the current collector and formed by deposition of a second composition including a second binder material and a second conductive additive,
    wherein the second binder material comprises a mixture of a polymer from the family of polyimides with an ethylene-vinyl alcohol copolymer, or a mixture of a polymer from the family of polyimides with a polyvinyl alcohol, or a mixture of a polymer from the family of polyimides with an ethylene-vinyl alcohol copolymer and with a polyvinyl alcohol,
    wherein:
    a mass content of the polymer from the family of polyimides in the second binder material is greater than or equal to 20%, and less than or equal to 80%,
    the second composition comprises a mass content in second binder material comprised between 40% and 70%,
    the second conductive additive includes one or several conductive elements for improving the electronic conductivity chosen from the group comprising of conductive carbon blacks, acetylene blacks, graphite's, graphenes, carbon nanotubes, nonactivated carbon nanofibers and a mixture thereof,
    the second composition C2 comprises a mass content in second conductive additive AC2 less than or equal to 60% and greater than or equal to 30%, and
    the interfacing layer formed by the second composition has a thickness between about 1 micrometer and about 4 micrometers,
    and
    an electrode layer, the electrode layer being formed by deposition of a first composition on the interfacing layer.

2. The cathode according to claim 1, wherein the first composition comprises a potential of hydrogen greater than or equal to 10, the potential of hydrogen being measured at a temperature of 25° C.

3. The cathode according to claim 1, wherein the first composition is a water-based cathode composition comprising a first insertion material, a first binder material and a first conductive additive.

4. The cathode according to claim 3, wherein the first insertion material comprises at least one of lithium-nickel-cobalt-manganese oxides, lithium-nickel-cobalt-aluminium oxides and a mixture thereof, the first insertion material being present in the composition in a dissolved form.

5. The cathode according to claim 3, wherein the first binder material comprises at least one of polyacrylic acids, polyvinyl alcohol, polyvinylpyrrolidone, hydroxypropyl cellulose, polyurethane, sodium alginate, styrene-butadiene and a mixture thereof.

6. The cathode according to claim 1, wherein the current collector is a metallic strip.

7. An electrochemical accumulator including a cathode according to claim 1.

8. An energy storage device including a set of accumulators, at least one accumulator being an accumulator according to claim 7.

9. The energy storage device according to claim 8, the device being a battery.

10. The energy storage device according to claim 9, wherein the device is a Lithium-ion battery.

11. The cathode according to claim 1, wherein the interfacing layer has a thickness less than or equal to 2 micrometers.

12. The cathode according to claim 1, wherein the second conductive additive comprises a mixture of carbon black and graphite.

13. The cathode according to claim 1, wherein:
    the second composition comprises, on a dry mass basis:
        from 50 wt. % to 60 wt. % total polymer, including from 30 wt. % to 50 wt. % of a polyimide and from 5 wt. % to 20 wt. % of an ethylene-vinyl alcohol copolymer, and
        from 40 wt. % to 50 wt. % of conductive carbon,
        wherein a combined total of the polymer and conductive carbon does not exceed 100 wt. % of the second composition; and
    the interfacing layer formed by the second composition has a thickness between about 1 micrometer and about 4 micrometers, and the current collector and the interfacing layer formed by the second composition together exhibits a transverse electrical resistance of not more than about 10 milliohms under a normal force of 0.27 MPa.

14. The cathode according to claim 1, wherein the current collector and the interfacing layer formed by the second composition together exhibits a transverse electrical resistance of not more than about 10 milliohms under a normal force of 0.27 MPa.

15. A method for manufacturing a cathode for an electrochemical accumulator comprising:
    a step for preparing a first composition, and
    a step for depositing, the first composition on a substrate formed by a current collector and an interfacing layer, the first composition being deposited on the interfacing layer, and the interfacing layer being formed by deposition of a second composition including a second binder material and a second conductive additive,
    wherein the second binder material comprises a mixture of a polymer from the family of polyimides with an ethylene-vinyl alcohol copolymer, or a mixture of a polymer from the family of polyimides with a polyvinyl alcohol, or a mixture of a polymer from the family of polyimides with an ethylene-vinyl alcohol copolymer and with a polyvinyl alcohol,
    wherein:
    a mass content of the polymer from the family of polyimides in the second binder material is greater than or equal to 20%, and less than or equal to 80%,
    the second composition comprises a mass content in second binder material comprised between 40% and 70%,
    the second conductive additive includes one or several conductive elements for improving the electronic conductivity chosen from the group comprising of conductive carbon blacks, acetylene blacks, graphites, graphenes, carbon nanotubes, nonactivated carbon nanofibers and a mixture thereof,
    the second composition C2 comprises a mass content in second conductive additive AC2 less than or equal to 60% and greater than or equal to 30%, and the interfacing layer formed by the second composition has a thickness between about 1 micrometer and about 4 micrometers.

16. The method according to claim 15, comprising:

a step for preparing the second composition comprising suspending the second binder material and the second conductive additive in water.

* * * * *